3,446,853
PRODUCTION OF ETHERS
Archie Newton and Frank Brangwin, Norton-on-Tees, England, assignors to Imperial Chemical Industries Limited, London, England, a corporation of Great Britain
No Drawing. Filed Aug. 5, 1966, Ser. No. 570,421
Claims priority, application Great Britain, Aug. 18, 1965, 35,366/65
Int. Cl. C07c 41/12
U.S. Cl. 260—614                                                  10 Claims

ABSTRACT OF THE DISCLOSURE

Methyl vinyl ether is separated from acetaldehyde by an extractive distillation in which an aliphatic alcohol is used as extractant. The alcohol is preferably methanol, the novel distillation being advantageously used in a continuous process for the production of methyl vinyl ether by pyrolysis of dimethyl acetal. Methanol required for the formation of dimethyl acetal by the reaction of methanol and acetaldehyde is added via the distillation step.

---

The invention relates to the production of methyl vinyl ether and in particular to the separation of methyl vinyl ether from mixtures comprising methyl vinyl ether and acetaldehyde.

Methyl vinyl ether may be obtained by condensing methanol with acetaldehyde to produce dimethyl acetal and subsequently passing the acetal at an elevated temperature over a catalyst to produce methyl vinyl ether. Although the dimethyl acetal may be separated from water, unchanged methanol and acetaldehyde following the condensation, it is in practice more convenient to separate the water only, and to pass the remaining mixture comprising methanol, acetaldehyde and acetal over the catalyst at elevated temperature. Following this thermal treatment therefore, a mixture comprising methyl vinyl ether, acetaldehyde, methanol and unchanged dimethyl acetal is obtained. Although such a mixture may be separated by distillation, the separation of the methyl vinyl ether from the acetaldehyde is troublesome. The present invention provides an improved distillation process for separating methyl vinyl ether from acetaldehyde which may be carried out at a lower reflux ratio.

According to the invention a mixture comprising methyl vinyl ether and acetaldehyde is distilled in a fractionating column, into which is continuously introduced at a feed point higher in the column than the feed point of the mixture, a liquid aliphatic alcohol containing one to four carbon atoms, and an overhead product is taken off comprising a higher proportion of methyl vinyl ether to acetaldehyde than was present in the mixture.

The mixture may contain methyl vinyl ether and acetaldehyde in any proportion and may also include other substances e.g. dimethyl acetal, which do not interfere with the distillation and which preferably are removed from the distillation column as a bottoms product.

The fractionating column in which the distillation takes place may be of conventional design and is provided with heating means at the base and a condenser system at the head. The column may be provided with trays to effect the fractionating or it may be random filled with packing bodies such as Raschig rings, which may be of metallic or ceramic material. Preferably the feed point at which the mixture comprising methyl vinyl ether and acetaldehyde is introduced is in the middle or lower half of the column and is selected so that the temperature at that point in the column is the same as the temperature of the incoming mixture. The feed point at which the liquid aliphatic alcohol is introduced is near to the top of the column and may effectively be located as near to the column head as possible without alcohol being carried out with the methyl vinyl ether.

As methyl vinyl ether boils at 6° C., a refrigeration condenser is provided when the distillation is carried out at atmospheric pressure. Alternatively the distillation may be carried out at an elevated pressure, suitably 5–10 atmospheres, when a water- or air-cooled condenser system may be employed.

The temperature at the base of the column is preferably maintained at about the boiling point of methanol, i.e. about 60° C. at atmospheric pressure. If the distillation is conducted at an elevated pressure then this temperature is correspondingly raised.

The rate at which the aliphatic alcohol is introduced to the column is related to the amount of acetaldehyde present in the mixture of methyl vinyl ether and acetaldehyde fed to the column. The alcohol may be fed in at the same rate measured in moles/hour as the rate at which the acetaldehyde is introduced to the column. Preferably the mole rate of addition of the alcohol is in excess of the mole rate of addition of the acetaldehyde, no account being taken of any alcohol fed in with the methyl vinyl ether and acetaldehyde.

Any of the liquid aliphatic alcohols containing from one to four carbon atoms may be used in the process of the present invention. However, when methanol is also present in the mixture to be treated, then it is preferred to use methanol as the alcohol.

By way of example, in a continuous process for the production of methyl vinyl ether which comprises condensing methanol with acetaldehyde to produce dimethyl acetal, separating a product comprising dimethyl acetal and unchanged methanol and acetaldehyde from water produced in the reaction and passing the product over a catalyst at an elevated temperature, methyl vinyl ether is separated from the ensuing mixture of methyl vinyl ether and unchanged dimethyl acetal, acetaldehyde and methanol by continuously distilling the mixture in a fractional distillation column, into which methanol is continuously introduced at a feed point higher in the column than the feed point of the mixture, a distillate is taken off overhead comprising a higher proportion of methyl vinyl ether to acetaldehyde than was present in the mixture, and a residue taken from the bottom of the column, comprising dimethyl acetal, methanol and acetaldehyde, is continuously recycled.

A particular advantage of this process is that methanol reacted in the process and removed as methyl vinyl ether may be made up, in material to be fed to the process, via the distillation column from which methyl vinyl ether is removed. All the methanol ultimately required for reaction may be added in this way as methanol in excess of that required to separate methyl vinyl ether and acetaldehyde has no adverse effect on the distillation.

The acetaldehyde and methanol may be condensed in the liquid phase to produce dimethyl acetal by use of an acid catalyst at a temperature between 0° C. and 50° C. The ensuing dimethyl acetal and unchanged acetaldehyde and methanol may be separated from the water produced in the condensation by distillation in a fractionating column in which the water is removed as a bottoms product and the organic components taken off overhead. The product comprising dimethyl acetal, methanol and acetaldehyde may then be vaporised and passed at a temperature of 200° C. to 450° C. over a catalyst, e.g. a catalyst comprising barium oxide deposited on silica gel. By this latter reaction dimethyl acetal is pyrolysed to give methyl vinyl ether and methanol which, together with unchanged dimethyl acetal and acetaldehyde, form the mixture to be separated by the process according to the present invention.

The invention will now be further described with reference to the following examples.

Example 1

A 1" Oldershaw column was assembled with a 10 plate top section, a feed point for methanol, a 15 plate middle section, a feed point for a mixture comprising methyl vinyl ether, methanol, acetal and acetaldehyde, and a 10 plate bottom section respectively. The column was fitted with a condenser cooled by a mixture of methanol and solid carbon dioxide and an electrically heated boiler.

Conditions during operation of the column were as follows:

| | |
|---|---|
| Column top temperature | ° C__ 6 |
| Methyl vinyl ether/acetaldehyde feed temperature | ° C__ 20 |
| Methanol feed temperature | ° C 20 |
| Boiler temperature | ° C__ 59 |
| Pressure | Atmospheric |
| Reflux ratio | 2:1 |
| Methanol feed rate | gms./hr__ 46 |
| Methyl vinyl ether/acetaldehyde feed rate | gms./hr__ 673 |
| Methanol:acetaldehyde mole ratio | 1.6:1 |
| Take off rate of methyl vinyl ether | gm./hr__ 161 |

The composition of the methyl vinyl ether/acetaldehyde feed was:

| | Percent by weight |
|---|---|
| Methyl vinyl ether | 23.5 |
| Acetaldehyde | 5.9 |
| Methanol | 35.1 |
| Dimethyl acetal | 29.9 |
| Water | 4.3 |

The methyl vinyl ether taken off overhead contained less than 0.1% by weight dimethyl acetal, methanol and acetaldehyde.

The bottom product from the column contained 0.9% methyl vinyl ether.

A comparative experiment under similar conditions without the methanol feed at a reflux ratio of 8:1 produced overheads containing 5% by weight of acetaldehyde.

Example 2

Example 1 was repeated, the operating conditions being as follows:

| | |
|---|---|
| Column top temperature | ° C__ 5.4 |
| Methyl vinyl ether/acetaldehyde feed temperature | ° C__ 20 |
| Methanol feed temperature | ° C__ 20 |
| Boiler temperature | ° C__ 59 |
| Pressure | Atmospheric |
| Reflux ratio | 3:1 |
| Methanol feed rate | grams/hour__ 43 |
| Methyl vinyl ether/acetaldehyde feed rate | do__ 526 |
| Methanol:acetaldehyde mole ratio | 1.45:1 |
| Take off rate of methyl vinyl ether | grams/hour__ 125 |

The composition of the methyl vinyl ether/acetaldehyde feed was:

| | Percent by weight |
|---|---|
| Methyl vinyl ether | 23 |
| Acetaldehyde | 7.8 |
| Methanol | 30.6 |
| Dimethyl acetal | 36.2 |

The methyl vinyl ether taken off overhead contained less than 0.5% by weight acetaldehyde.

The bottom product from the column contained 0.2% by weight methyl vinyl ether.

Example 3

Example 1 was repeated using isobutanol instead of methanol as the aliphatic alcohol.

The operating conditions were as follows:

| | |
|---|---|
| Column top temperature | ° C__ 6.0 |
| Methyl vinyl ether/acetaldehyde feed temperature | ° C__ 3.5 |
| Isobutanol feed temperature | ° C__ 21 |
| Boiler temperature | ° C__ 49 |
| Pressure | Atmospheric |
| Reflux ratio | 2:1 |
| Isobutanol feed rate | grams/hour__ 133 |
| Methyl vinyl ether/acetaldehyde feed rate | do__ 573 |
| Isobutanol:acetaldehyde mole ratio | 2.13:1 |
| Take off rate of methyl vinyl ether | grams/hour_ 205 |

The composition of the methyl vinyl ether/acetaldehyde feed was:

| | Percent by weight |
|---|---|
| Methyl vinyl ether | 43.5 |
| Acetaldehyde | 6.5 |
| Isobutanol | 50.0 |

The methyl vinyl ether taken off overhead contained 0.7% by weight acetaldehyde.

The bottom product from the column contained 6.2% by weight methyl vinyl ether.

We claim:

1. A process for the separation of methyl vinyl ether from a mixture comprising methyl vinyl ether and acetaldehyde which comprises distilling the mixture in a fractionating column into which is continuously introduced at a feed point higher in the column than the feed point of the mixture a liquid alkanol containing one to four carbon atoms, and taking off an overhead product comprising a higher proportion of methyl vinyl ether to acetaldehyde than was present in the mixture.

2. The process of claim 1 in which an elevated pressure from 5 to 10 atmospheres is used.

3. The process of claim 1 in which the mole rate of addition of the alcohol is greater than the mole rate of addition of the acetaldehyde in the mixture.

4. The process of claim 1 in which the feed point at which the liquid alkanol is introduced to the column is located as near to the column head as possible without alkanol being carried out with the methyl vinyl ether.

5. The process of claim 4 in which the feed point at which the mixture is introduced is in the middle or lower half of the column, the temperature in the column at this point being the same as the temperature of the incoming mixture.

6. The process of claim 5 in which the temperature at the base of the column is maintained at approximately the boiling point of methanol.

7. The process of claim 6 in which the alkanol is methanol.

8. The process of claim 1 wherein said mixture is produced by condensing methanol with acetaldehyde to produce dimethyl acetal, separating a product comprising dimethyl acetal and unchanged methanol and acetaldehyde from water produced in the reaction passing the product over a catalyst at an elevated temperature and separating methyl vinyl ether from the ensuing mixture of methyl vinyl ether, unchanged dimethyl acetal, acetaldehyde and methanol, and recycling a residue taken from the bottom of the column comprising dimethyl acetal, methanol and acetaldehyde.

9. The process of claim 8 in which all the methanol required to react with the acetaldehyde to form the dimethyl acetal is added to the process via the fractional distillation column, from which it is recovered and recycled to the acetal forming process.

10. The process of claim 8 wherein the base of the said column is heated and maintained at about the boiling point of methanol, the said mixture is fed into the column at a point where the temperature is about the same as the temperature of the mixture being fed thereinto and the methanol is fed into the column as near to the top thereof without methanol being carried out with the methyl vinyl ether, and wherein the moles of methanol being fed into the column is at least equal to the mole of acetaldehyde.

References Cited

UNITED STATES PATENTS

| | | |
|---|---|---|
| 1,850,836 | 3/1932 | Guinot. |
| 1,931,858 | 10/1933 | Baur _____ 260—614 XR |
| 2,667,517 | 1/1954 | Longley _____ 260—614 |
| 2,691,684 | 10/1954 | Frevel et al. |
| 2,721,222 | 10/1955 | Cottle et al. _____ 260—616 |
| 2,840,615 | 6/1958 | Stautzenberger. |
| 3,265,593 | 8/1966 | Leis et al. _____ 203—63 |

FOREIGN PATENTS 681,059  10/1952  Great Britain.

BERNARD HELFIN, *Primary Examiner.*

HOWARD T. MARS, *Assistant Examiner.*

U.S. Cl. X.R.

203—63; 260—616